(12) United States Patent
Kim et al.

(10) Patent No.: US 9,608,471 B2
(45) Date of Patent: Mar. 28, 2017

(54) METHOD AND APPARATUS FOR CONTROLLING WIRELESS POWER TRANSMISSION

(71) Applicants: SAMSUNG ELECTRONICS CO., LTD., Suwon-si (KR); Korea Advanced Institute of Science and Technology, Daejeon (KR)

(72) Inventors: Bong Chul Kim, Seoul (KR); Sang Wook Kwon, Seongnam-si (KR); Ki Young Kim, Yongin-si (KR); Nam Yun Kim, Seoul (KR); Gun Woo Moon, Daejeon (KR); Sang Cheol Moon, Daejeon (KR); Chi Hyung Ahn, Suwon-si (KR); Shin Young Cho, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 564 days.

(21) Appl. No.: 14/157,268

(22) Filed: Jan. 16, 2014

(65) Prior Publication Data
US 2014/0265615 A1 Sep. 18, 2014

(30) Foreign Application Priority Data
Mar. 18, 2013 (KR) .................. 10-2013-0028436

(51) Int. Cl.
*H01F 27/42* (2006.01)
*H02J 7/02* (2016.01)
(Continued)

(52) U.S. Cl.
CPC ............ *H02J 7/025* (2013.01); *B60L 11/182* (2013.01); *B60L 11/1824* (2013.01);
(Continued)

(58) Field of Classification Search
CPC . H02J 7/008; H02J 7/025; Y04S 30/14; B60L 11/182; B60L 2210/30; Y02T 10/7044; Y02T 90/163
(Continued)

(56) References Cited

U.S. PATENT DOCUMENTS

2011/0285349 A1 11/2011 Widmer et al.
2011/0291491 A1 12/2011 Lemmens et al.
(Continued)

FOREIGN PATENT DOCUMENTS

KR 10-2011-0065969 A 6/2011
KR 10-2011-0078219 A 7/2011
(Continued)

*Primary Examiner* — Jared Fureman
*Assistant Examiner* — Duc M Pham
(74) *Attorney, Agent, or Firm* — NSIP Law

(57) ABSTRACT

A method and an apparatus for controlling wireless power transmission are provided. An apparatus for controlling wireless power transmission includes a controller configured to determine an output voltage of a power factor correction unit based on charging information of a battery, the power factor correction unit configured to correct an input voltage into the determined output voltage, and output a variable voltage, and a resonance unit configured to transmit power converted from the variable voltage to a wireless power reception apparatus.

18 Claims, 19 Drawing Sheets

(51) Int. Cl.
*H02J 17/00* (2006.01)
*B60L 11/18* (2006.01)
*H02J 7/00* (2006.01)

(52) U.S. Cl.
CPC ....... *B60L 11/1846* (2013.01); *B60L 11/1861* (2013.01); *H02J 17/00* (2013.01); *B60L 2210/30* (2013.01); *B60L 2210/40* (2013.01); *B60L 2240/36* (2013.01); *B60L 2240/547* (2013.01); *B60L 2240/549* (2013.01); *H02J 7/008* (2013.01); *Y02T 10/705* (2013.01); *Y02T 10/7005* (2013.01); *Y02T 10/7044* (2013.01); *Y02T 10/7072* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC .......................................................... 307/104
See application file for complete search history.

(56) References Cited

U.S. PATENT DOCUMENTS

| | | | |
|---|---|---|---|
| 2012/0091970 A1* | 4/2012 | Cho | H02J 7/022 320/160 |
| 2012/0098348 A1 | 4/2012 | Inoue et al. | |
| 2012/0146425 A1 | 6/2012 | Lee et al. | |
| 2012/0293007 A1 | 11/2012 | Byun et al. | |
| 2012/0293009 A1 | 11/2012 | Kim et al. | |
| 2013/0214591 A1* | 8/2013 | Miller | H02J 5/005 307/9.1 |
| 2013/0293192 A1* | 11/2013 | Abe | B60L 11/123 320/108 |

FOREIGN PATENT DOCUMENTS

| | | |
|---|---|---|
| KR | 10-2012-0088709 A | 8/2012 |
| KR | 10-2012-0128554 A | 11/2012 |
| KR | 10-2012-0129821 A | 11/2012 |

* cited by examiner

→ INPUT CURRENT
---→ INDUCED CURRENT

METHOD AND APPARATUS FOR CONTROLLING WIRELESS POWER TRANSMISSION

CROSS-REFERENCE TO RELATED APPLICATION(S)

This application claims the benefit under 35 USC 119(a) of Korean Patent Application No. 10-2013-0028436 filed on Mar. 18, 2013, in the Korean Intellectual Property Office, the entire disclosure of which is incorporated herein by reference for all purposes.

BACKGROUND

1. Field

The following description relates to a method and an apparatus for power transmission control, and to technology that adjusts to a charging capacity of an apparatus that receives power wirelessly.

2. Description of Related Art

An explosive increase in the use of electronic devices has spurred researches on wireless power transmission technology to overcome increased inconveniences of providing wired power supplies and the limited capacity of conventional batteries. Examples of electronic devices that may benefit from such technology includes electric vehicles, mobile devices, and the like. One of the wireless power transmission technologies under research focuses on using resonance characteristics of radio frequency (RF) devices in transmitting power wirelessly. A wireless power transmission system using resonance characteristics may include a source configured to supply power, and a target configured to receive supplied power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for controlling wireless power transmission, the apparatus including: a controller configured to determine an output voltage of a power factor correction unit based on charging information of a battery; the power factor correction unit configured to correct an input voltage into the determined output voltage, and output a variable voltage; and a resonance unit configured to transmit power converted from the variable voltage to a wireless power reception apparatus.

The charging information may be obtained from the wireless power reception apparatus, and may include at least one of a charging level, a charging capacity, and a charging type of the battery.

The power factor correction unit may be configured to obtain the input voltage from a power supply, and to output the variable voltage based on a result of the determining of the controller. The resonance unit may be configured to transmit the power converted from the variable voltage to an alternating current (AC) voltage using a resonant frequency of a resonator to the wireless power reception apparatus.

The general aspect of the apparatus may further include: an inverter configured to convert a fixed output voltage into an AC voltage based on a variable frequency, in which the power factor correction unit is configured to output the fixed output voltage.

The controller may be configured to determine a value of the variable frequency in a resonant frequency band of the resonator, based on the obtained charging information of the battery.

The controller may include: a gain calculator configured to calculate a voltage gain with respect to the output voltage of the power factor correction unit, based on a value of a voltage to be applied to the battery; and a frequency determiner configured to determine a value of the variable frequency, among frequencies having transmission efficiencies greater than or equal to a predetermined transmission efficiency, based on a transmission efficiency allowing for the calculated voltage gain. The value of the voltage to be applied to the battery may be obtained from the wireless power reception apparatus.

The general aspect of the apparatus may further include: an inverter configured to convert an output voltage of the power factor correction unit into an AC voltage based on a variable frequency, in which the controller is configured to determine a value of the variable frequency in a resonant frequency band of the resonator and the output voltage of the power factor correction unit, based on the obtained charging information of the battery.

The general aspect of the apparatus may further include: a communication unit configured to receive the charging information of the battery from the wireless power reception apparatus.

In another general aspect, there is provided an apparatus for controlling wireless power transmission, the apparatus including: a controller configured to determine a variable frequency of an inverter based on charging information of a battery; the inverter configured to convert an input voltage into an alternating (AC) voltage based on the determined variable frequency; and a resonance unit configured to transmit power converted into the AC voltage to a wireless power reception apparatus.

The charging information may be obtained from the wireless power reception apparatus, and may include at least one of a charging level, a charging capacity, and a charging type of the battery.

The input voltage to the inverter may be obtained from a power supply. The resonance unit may be configured to transmit the power converted into the AC voltage using the variable frequency as a resonant frequency of a resonator to the wireless power reception apparatus.

The general aspect of the apparatus may further include: a power factor correction unit configured to correct an input voltage from a power supply into the determined output voltage, to output a variable voltage based on a result of the determining by the controller, in which the inverter is configured to convert the variable voltage into an AC voltage using a basic resonant frequency of the resonator.

The controller may be configured to determine the output voltage of the power factor correction unit based on the obtained charging information of the battery.

The controller may include: a gain calculator configured to calculate a voltage gain with respect to the input voltage, based on a value of a voltage to be applied to the battery; and a frequency determiner configured to determine a value of the variable frequency, among frequencies having transmission efficiencies greater than or equal to a predetermined transmission efficiency, based on a transmission efficiency allowing for the calculated voltage gain, in which the value of the voltage to be applied to the battery is obtained from the wireless power reception apparatus.

The general aspect of the apparatus may further include: a power factor correction unit configured to correct the input voltage into the determined output voltage and output a variable voltage based on a result of the determining by the controller, in which the controller is configured to determine a value of the variable frequency in a resonant frequency band of the resonator and the output voltage of the power factor correction unit, based on the obtained charging information of the battery.

The general aspect of the apparatus may further include: a communication unit configured to receive the charging information of the battery from the wireless power reception apparatus.

In another general aspect, there is provided an apparatus for controlling wireless power transmission, the apparatus including: a controller configured to determine an output voltage of a power factor correction unit and a variable frequency of an inverter, based on charging information of a battery; the power factor correction unit configured to correct an input voltage into the determined output voltage, to output a variable voltage based on a result of the determining by the controller; the inverter configured to convert the variable voltage into an alternating (AC) voltage based on the determined variable frequency; and a resonance unit configured to transmit power converted into the AC voltage to a wireless power reception apparatus.

The charging information may be obtained from the wireless power reception apparatus, and may include at least one of a charging level, a charging capacity, and a charging type of the battery. The power factor correction unit may be configured to obtain the input voltage from a power supply. The resonance unit may be configured to transmit the power converted into the AC voltage using the variable frequency as a resonant frequency of a resonator to the wireless power reception apparatus.

The controller may include: a gain calculator configured to calculate a voltage gain with respect to the output voltage of the power factor correction unit, based on a value of a voltage to be applied to the battery; a frequency determiner configured to determine a value of the variable frequency, among frequencies having transmission efficiencies greater than or equal to a predetermined transmission efficiency, based on a transmission efficiency allowing for the calculated voltage gain; and a voltage determiner configured to an output voltage of the power factor correction unit based on the transmission efficiency. The value of the voltage to be applied to the battery may be obtained from the wireless power reception apparatus.

The general aspect of the apparatus may further include: a communication unit configured to receive charging information of the battery from the wireless power reception apparatus.

In another general aspect, there is provided a method for controlling power transmission, the method involving: determining an output voltage of a power factor correction unit based on charging information of a battery; correcting an input voltage to the power factor correction unit into the determined output voltage, and outputting a variable voltage that varies based on a result of the determining; and transmitting power converted from the variable voltage into an alternating (AC) voltage to a wireless power reception apparatus.

The determining of the output voltage may be performed with a controller of an apparatus for controlling wireless power transmission. The charging information may be obtained from the wireless power reception apparatus.

The determining of the output voltage may involve: calculating, by the controller, a voltage gain with respect to the output voltage of the power factor correction unit, based on a value of a voltage to be applied to the battery; and determining, by the controller, a value of the variable frequency, among frequencies having transmission efficiencies greater than or equal to a predetermined transmission efficiency, based on a transmission efficiency allowing for the calculated voltage gain. The value of the voltage to be applied to the battery may be obtained from the wireless power reception apparatus.

Other features and aspects will be apparent from the following detailed description, the drawings, and the claims.

BRIEF DESCRIPTION OF THE DRAWINGS

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
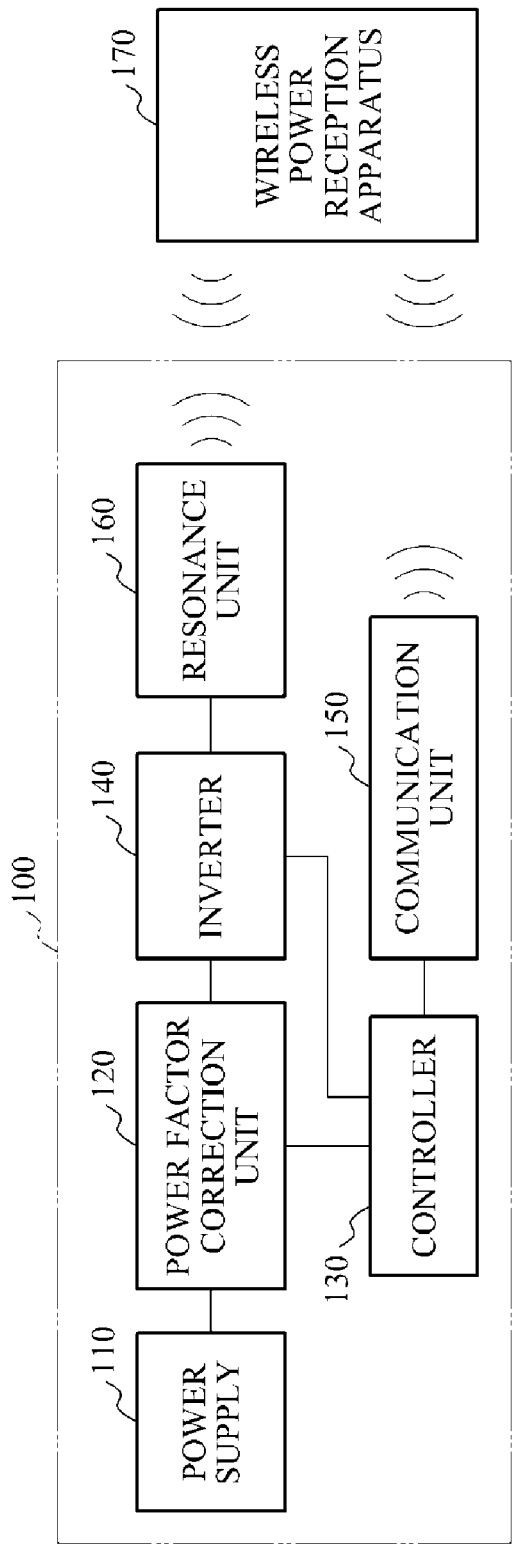
FIG. 1 is a diagram illustrating an example of an apparatus for controlling wireless power transmission.

FIG. 1 illustrates an example of an apparatus for controlling wireless power transmission. The apparatus is herein referred to as a wireless power transmission control apparatus 100.

Referring to FIG. 1, the wireless power transmission control apparatus 100 includes a power supply 110, a power factor correction unit 120, a controller 130, an inverter 140, a communication unit 150, and a resonance unit 160.

The controller 130 may determine an output voltage of the power factor correction unit 120 based on charging information of a battery included in a wireless power reception apparatus 170. The charging information of the battery may be obtained from the wireless power reception apparatus 170, via the communication unit 150 of the wireless power transmission control apparatus 100.

The charging information of the battery may include at least one of a charging level, a charging capacity, and a charging type of the battery. For example, the charging level of the battery may be expressed by a percentage of a charged amount with respect to a capacity of the battery. The charging capacity of the battery may refer to a capacity of the battery. The charging type of the battery may indicate whether the battery is capable of being charged wirelessly, whether the battery is capable of being charged via hard wire, whether the battery corresponds to a polymer type battery, and the like.

The controller 130 may determine that an amplitude of an output voltage for the output voltage of the power factor correction unit 120 is to be increased based on the charging level of the battery. The controller 130 may also determine that an amplitude of an output voltage for the output voltage of the power factor correction unit 120 is to be decreased based on a discharging level of the battery.

The power factor correction unit 120 may correct an input voltage input from the power supply 110 into the determined output voltage as determined by the controller 130, in order to output a variable voltage based on a result of the determining performed by the controller 130. For example, a power factor corrector (PFC) may be used as the power factor correction unit 120. The power factor corrector 120 may adjust the input voltage to be an output voltage having a predetermined amplitude. For example, the predetermined amplitude may be determined by the controller 130. In one example, the predetermined amplitude may be changed variably, rather than being fixed, based on a result of the determining by the controller 130. Accordingly, the power factor correction unit 120 may output a variable voltage.

By using the variable voltage output from the power factor correction unit 120, the wireless power transmission control apparatus 100 may charge the battery stably, without using pre-regulator or post-regulator that are generally used in a transmitter (TX) and a receiver (RX). The pre-regulator may be included in a transmitter (TX) configured to supply power, and the post-regulator may be included in a receiver (RX) configured to receive power.

The power supply 110 may provide a 3-phase alternating (AC) voltage. For example, the power supply 110 may include a bridge diode configured to rectify a 3-phase AC voltage. The power supply 110 may rectify the 3-phase AC voltage into a direct (DC) voltage, using the bridge diode. In addition, the power supply 110 may provide power of a single phase AC voltage. The power supply 110 may convert the single AC voltage into a DC voltage, using the bridge diode.

The inverter 140 may convert a DC voltage output from the power factor correction unit 120 into an AC voltage, using a basic resonant frequency of a resonator. The inverter 140 may be implemented with a full bridge inverter, or a half bridge inverter. The basic resonant frequency may refer to a resonant frequency initially set based on a physical property of the resonator. The resonant frequency may be changed based on a result of determining performed by the controller 130.

The resonance unit 160 may transmit power converted into the AC voltage by the inverter 140 to the wireless power reception apparatus 170 that mutually resonates with the resonator at the resonant frequency.

In addition, the power factor correction unit 120 may output a fixed output voltage initially set, and the inverter 140 may convert the fixed output voltage into an AC voltage based on a variable frequency. For example, the power factor correction unit 120 may be set to output the fixed output voltage. The inverter 140 may convert the fixed output voltage into the AC voltage based on the variable frequency. The controller 130 may determine a value of the variable frequency based on the charging information of the battery obtained from the wireless power reception apparatus 170. The value of the variable frequency may be determined in a resonant frequency band of the resonator. By such a conversion of output voltage into the AC voltage based on the variable frequency, a function performed by the pre-regulator or post-regulator may be replaced.

The resonance unit 160 may transmit the power converted into the AC voltage using the determined variable frequency as the resonant frequency of the resonator to the wireless power reception apparatus 170 that mutually resonates with the resonator at the resonant frequency.

Further, the power factor correction unit 120 may output a variable voltage as an output voltage, and the inverter 140 may convert the variable voltage into an AC voltage based on the variable frequency. The controller 130 may determine a value of the variable frequency in a resonant frequency band of the resonator and the output voltage of the power factor correction unit 120, based on the charging information of the battery obtained from the wireless power reception apparatus 170. There may be a margin for varying a voltage by the power factor correction unit 120. For example, in response to a determination that a voltage is to be adjusted to be in a range that exceeds the margin in order to increase a transmission efficiency, the transmission efficiency may be increased by adjusting the value of the variable frequency that is to be used by the inverter 140.

For example, when a desired transmission efficiency is set to 90% and a current transmission efficiency corresponds to 80%, the output voltage of the power factor correction unit 120 may be increased to 100 volts (V) in order to increase the transmission efficiency by more than 10%. However, in the event that a margin of the output voltage of the power factor correction unit 120 corresponds to 60 V, the controller 130 may determine the output voltage of the power factor correction unit 120 to be less than or equal to 60 V, and cover a transmission efficiency corresponding to the remaining 40 V by adjusting a value of the variable frequency that is to be used by the inverter 140.

In another example, when a desired transmission efficiency is set to 90% and a current transmission efficiency corresponds to 80%, the value of the variable frequency to be used by the inverter 140 is to be 110 hertz (Hz) in order to increase the transmission efficiency by more than 10%. However, when the margin of the variable frequency is in a range of 90 Hz to 100 Hz, the controller 130 may determine the value of the variable frequency to be a value in the range of 90 Hz to 100 Hz, and cover a transmission efficiency corresponding to the remaining 10 Hz or more by adjusting the output voltage of the power factor correction unit 120.

As described above, through the conversion of the output voltage to AC voltage based on the variable voltage of the power factor correction unit 120 and the variable frequency of the inverter 140, a function performed by the pre-regulator or post-regulator may be replaced.

In the above example, the resonance unit 160 may transmit the power converted into the AC voltage by the inverter 140 using the variable frequency determined by the controller 130 as the resonant frequency of the resonator to the wireless power reception apparatus 170 that mutually resonates with the resonator at the resonant frequency.

Figure 2:
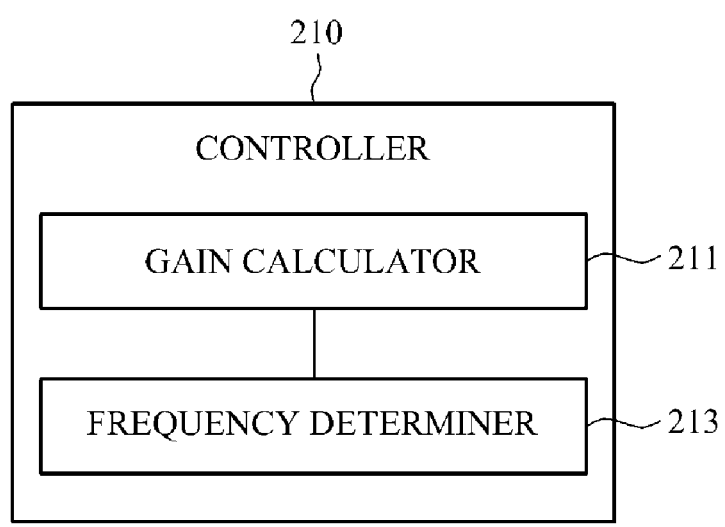
FIG. 2 is a diagram illustrating an example of a controller in an apparatus for controlling wireless power transmission.

FIG. 2 illustrates an example of a controller 210 that is included in an apparatus for controlling wireless power transmission.

Referring to FIG. 2, the controller 210 includes a gain calculator 211, and a frequency determiner 213. The controller 210 may be used as the controller 130 illustrated in FIG. 1.

The gain calculator 211 may calculate a voltage gain with respect to an output voltage of the power factor correction unit 120 illustrated in FIG. 1, based on a value of a voltage to be applied to a battery of a wireless power reception apparatus. The value of the voltage to be applied to the battery may be obtained from the wireless power reception apparatus. For example, the voltage gain may be calculated based on the value of the voltage to be applied to the battery and the output voltage of the power factor correction unit 120.

In addition, the gain calculator 211 may calculate a voltage gain with respect to an input voltage of an inverter, based on a value of a voltage to be applied to the battery of the wireless power reception apparatus. The value of the voltage to be applied to the battery may be obtained from the wireless power reception apparatus. For example, the voltage gain may be calculated based on the value of the voltage to be applied to the battery and the input voltage of the inverter.

The frequency determiner 213 may calculate a transmission efficiency based on the voltage gain calculated by the gain calculator 211. The frequency determiner 213 may calculate the transmission efficiency in a frequency band applicable to the inverter 140 of FIG. 1. The frequency determiner 213 may determine a value of a variable frequency to be used by the inverter 140, among frequencies having values greater than or equal to a predetermined transmission efficiency. The predetermined transmission efficiency may be set or changed by the controller 210.

In addition, the frequency determiner 213 may determine the value of the variable frequency to be used by the inverter 140, using a frequency having a greatest voltage gain of voltage gains calculated by the gain calculator 211. For example, the gain calculator 211 may calculate a voltage gain in a frequency band applicable to the inverter 140. The calculated voltage gain may be displayed by a graph based on a frequency. In an example, the frequency determiner 213 may determine the frequency having the greatest voltage gain of the calculated voltage gains to be the value of the variable frequency. As another example, the frequency determiner 213 may determine one of frequencies having voltage gains greater than or equal to a set voltage gain, among the calculated voltage gains, to be the value of the variable frequency.

Figure 3:
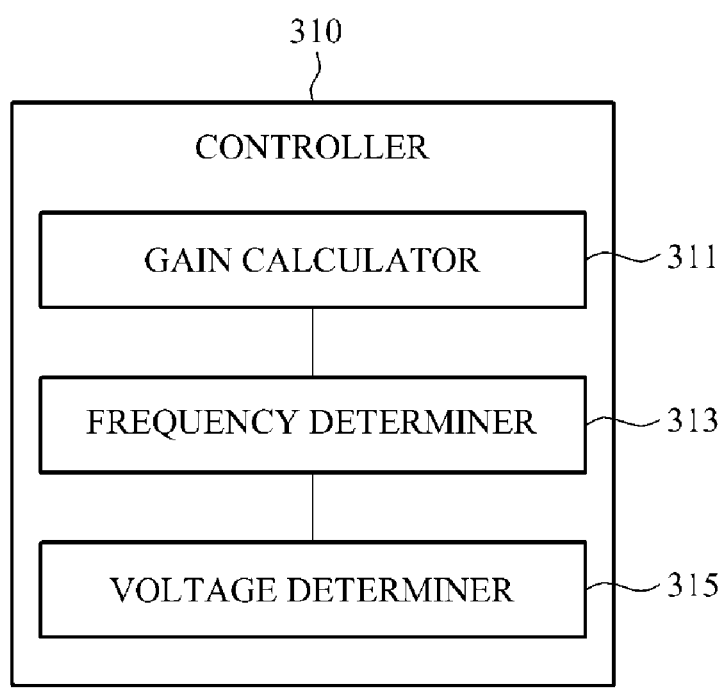
FIG. 3 is a diagram illustrating another example of a controller in an apparatus for controlling wireless power transmission.

FIG. 3 illustrates another example of a controller 310 included in an apparatus for controlling wireless power transmission.

Referring to FIG. 3, the controller 310 includes a gain calculator 311, a frequency determiner 313, and a voltage determiner 315. The controller 310 may be used as the controller 130 illustrated in FIG. 1.

The gain calculator 311 may calculate a voltage gain with respect to an output voltage of the power factor correction unit 120 of FIG. 1, based on a value of a voltage to be applied to a battery of a wireless power reception apparatus. The value of the voltage to be applied to the battery may be obtained from the wireless power reception apparatus. The voltage gain may be calculated based on the value of the voltage to be applied to the battery and the output voltage of the power factor correction unit 120.

The frequency determiner 313 may calculate a transmission efficiency based on the voltage gain calculated by the gain calculator 311. The frequency determiner 313 may calculate the transmission efficiency in a frequency band applicable to the inverter 140 illustrated in FIG. 1. The frequency determiner 313 may determine a value of a variable frequency to be used by the inverter 140, among frequencies having values greater than or equal to a predetermined transmission efficiency. The predetermined transmission efficiency may be set or changed by the controller 310.

In addition, the frequency determiner 313 may determine one of frequencies having voltage gains greater than or equal to a set voltage gain, among voltage gains calculated by the gain calculator 311, to be the value of the variable frequency.

The voltage determiner 315 may determine the output voltage of the power factor correction unit 120, based on a transmission efficiency of the apparatus for controlling wireless power transmission. The voltage determiner 315 may determine the output voltage in view of a margin of a voltage to be output by the power factor correction unit 120, for the transmission efficiency of the apparatus for controlling wireless power transmission to reach a predetermined degree of transmission efficiency. In addition, the voltage determiner 315 may determine the output voltage of the power factor correction unit 120, based on a charging level of the battery of the wireless power reception apparatus.

Further, the voltage determiner 315 may determine the output voltage of the power factor correction unit 120, using a value corresponding to a square root of the value of the voltage applied to the battery of the wireless power reception apparatus. Information regarding the value of the voltage to be applied to the battery may be obtained by the communication unit 150 of the apparatus for controlling wireless power transmission, as illustrated in FIG. 1.

Figure 4:
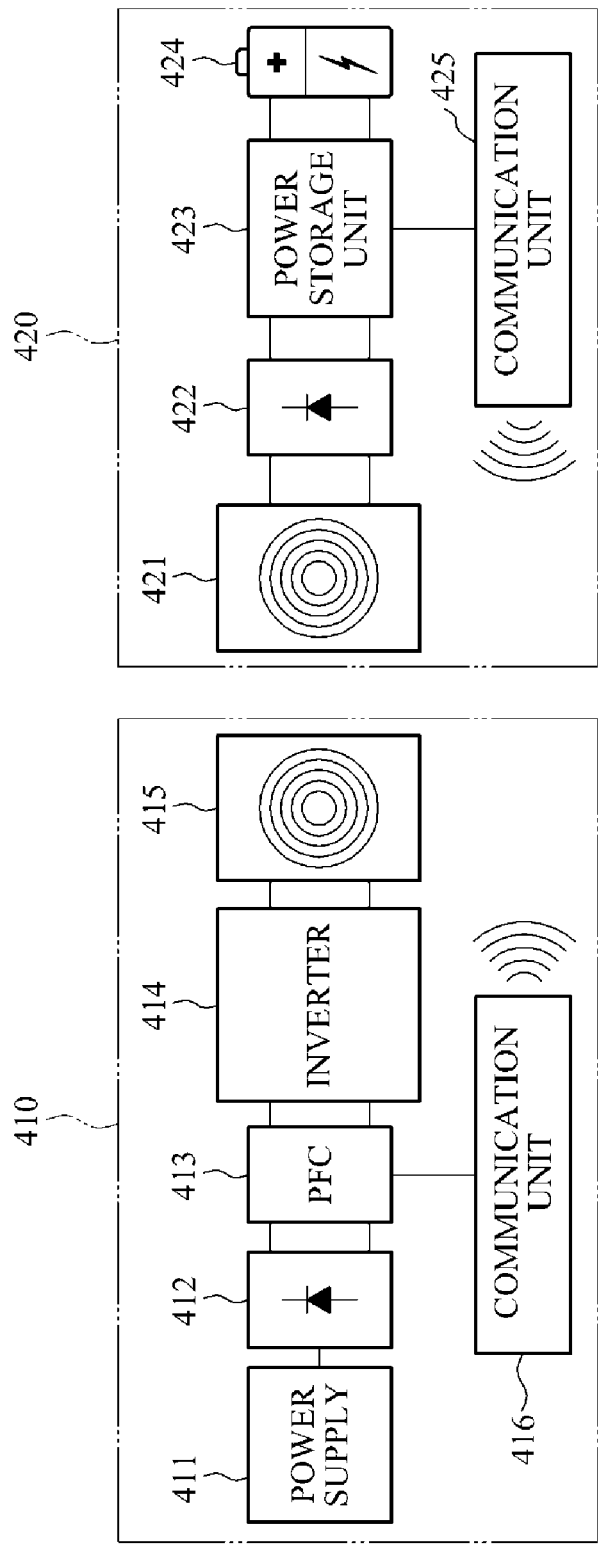
FIG. 4 is a diagram illustrating an example of a wireless power transmission control system.

FIG. 4 illustrates an example of a wireless power transmission control system.

Referring to FIG. 4, the wireless power transmission control system includes a wireless power transmission apparatus 410 and a wireless power reception apparatus 420.

The wireless power transmission apparatus 410 includes a power supply 411, an AC-to-DC (AC/DC) converter 412, a PFC 413, an inverter 414, a resonator 415, and a communication unit 416.

The power supply 411 may provide power in a form of a 3-phase AC voltage. For example, the AC/DC converter 412 may be configured by a 3-phase bridge diode, and may convert the power of the 3-phase AC voltage input from the power supply 411 into power of a DC voltage. In addition, the power supply 411 may provide power of a single phase AC voltage. The AC/DC converter 412 may convert the power of the single phase AC voltage into power of a DC voltage.

The PFC 413 may determine an output voltage of the PFC 413 based on charging information of a battery 424 of the wireless power reception apparatus 420. The charging information of the battery 424 may be received by the communication unit 416. In addition, the output voltage of the PFC 413 may be determined by a controller (not shown), based on the charging information of the battery 424. A value determined to be the output voltage of the PFC 413 may be set differently for each type of the PFC 413. For example, as the charging information of the battery 424, when a voltage to be applied to the battery 424 is increased by a factor of two in comparison to a voltage that used to be applied, the output voltage of the PFC 413 may be determined to be a value that is two times the voltage that used to be output. The battery 424 may be used as an example representing a load.

The inverter 414 may convert the output voltage of the PFC 413 into an AC voltage, using a resonant frequency of the resonator 415. In an example, the inverter 414 may vary a resonant frequency to be used by the inverter 414, based on the charging information of the battery 424. In another example, a frequency to be used by the inverter 414 may be determined by the controller, based on the charging information of the battery 424. The inverter 414 may be implemented with a full bridge inverter, or a half bridge inverter. The resonator 415 may mutually resonate with a resonator 421 at the resonant frequency, whereby the inverter 414 may transfer the power to the resonator 421.

The wireless power reception apparatus 420 includes the resonator 421, a rectifier 422, a power storage unit 423, the battery 424, and a communication unit 425. The power transferred to the resonator 421 may be rectified by the rectifier 421. For example, various types of diodes may be used as the rectifier 422. The power storage unit 423 may store the rectified power. For example, a capacitor may be used as the power storage unit 423. The battery 424 may be charged using the power stored in the power storage unit 423. The communication unit 425 may transmit, to the communication unit 416, information about the power stored in the power storage unit 423, information about an output voltage of the power storage unit 423, information about an input voltage of the battery 424, charging information of the battery 424, and the like. In the example of FIG. 4, although the power is transferred to the battery 424 through the power storage unit 423, method of power transfer is not limited thereto. In another example, the power storage unit 423 may be omitted, and the power rectified by the rectifier 423 may be transferred directly to the battery 424.

Figure 5:
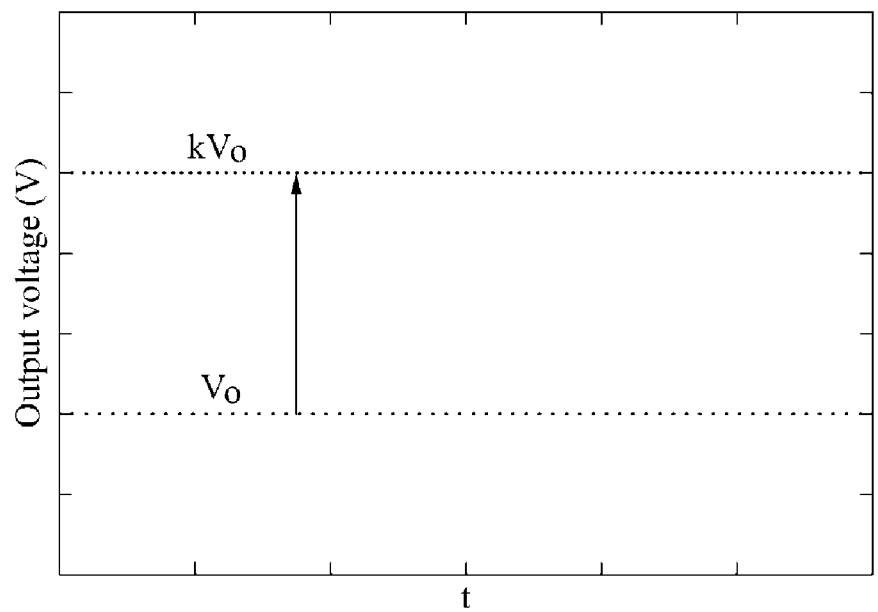
FIG. 5 is a graph illustrating an example of a range of change in a voltage to be applied to a battery in a wireless power reception apparatus.

FIG. 5 illustrates an example of a range of change in a voltage to be applied to a battery in a wireless power reception apparatus. Referring to FIG. 5, a change in the voltage to be applied to the battery from $V_o$ to $kV_o$ may be required.

Figure 6:
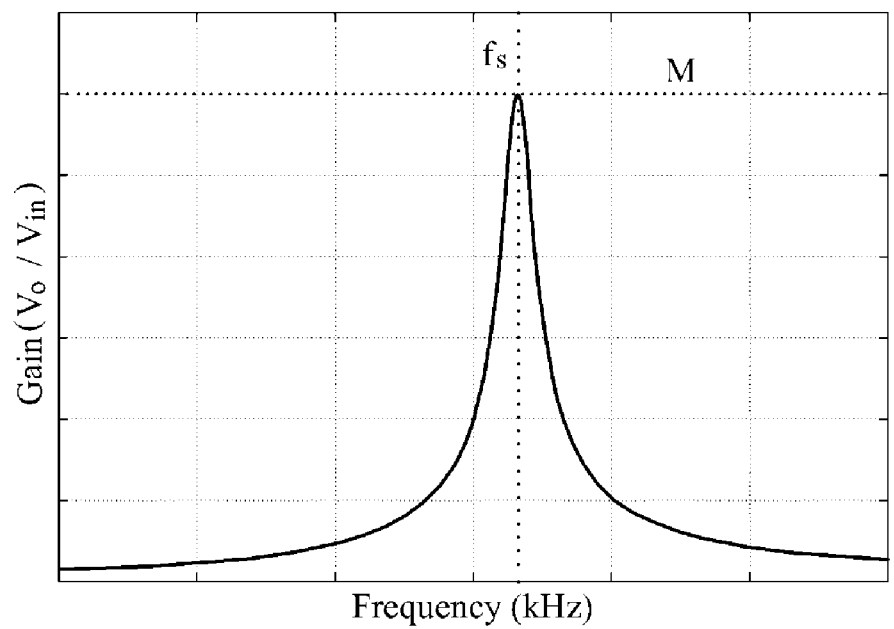
FIG. 6 is a graph illustrating an example of a gain of a system that includes an apparatus for controlling wireless power transmission.

FIG. 6 illustrates an example of a gain of a system including an apparatus for controlling wireless power transmission. Referring to FIG. 6, in the event that operating frequencies of a resonator and an inverter are fixed, a gain of the system including the apparatus for controlling wireless power transmission and the wireless power reception apparatus may be fixed to $\text{gain}(V_o/V_{in})=M$. Accordingly, a voltage to be applied to a battery may be increased to $kV_o$, by increasing an output voltage of a power factor correction unit to $kV_{in}$.

Figure 7:
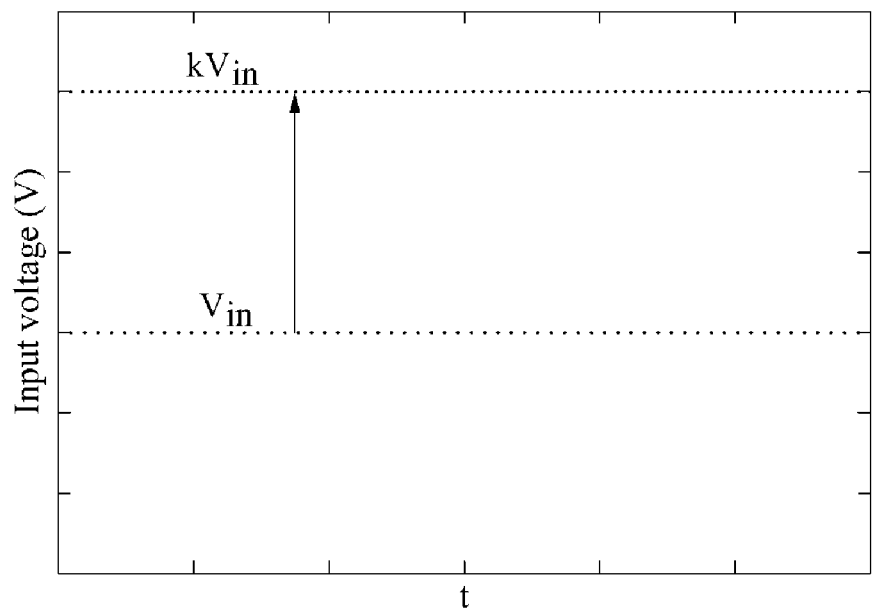
FIG. 7 is a graph illustrating an example of a range of change in an output voltage of a power factor correction unit.

FIG. 7 illustrates an example of a range of change in an output voltage of a power factor correction unit in an apparatus for controlling wireless power transmission. In the conditions of FIGS. 5 and 6, by correcting an output voltage of the power factor correction unit into $kV_{in}$, a voltage of $kV_o$ may be applied to a battery of a wireless power reception apparatus.

Figure 8:
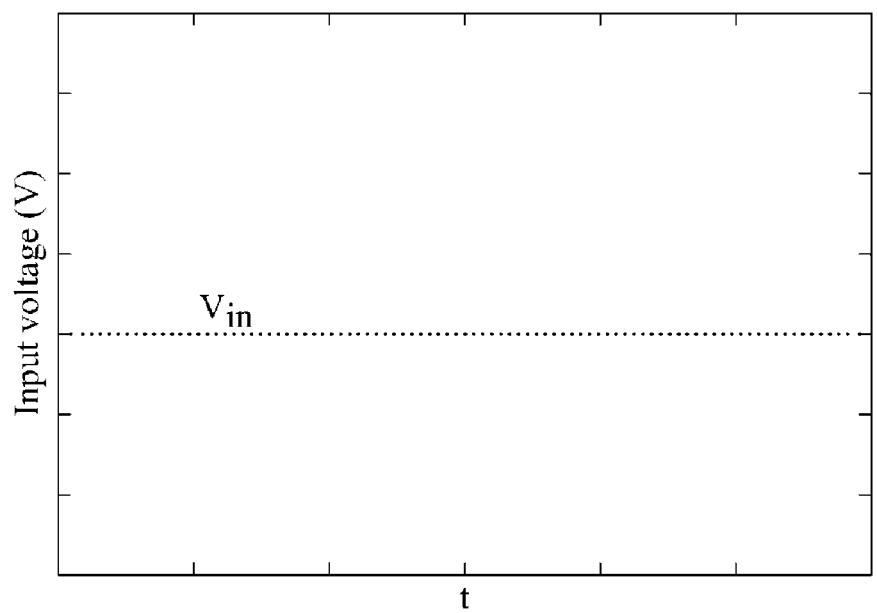
FIG. 8 is a graph illustrating an example of a range of change in a fixed output voltage of a power factor correction unit.

FIG. 8 illustrates an example of a range of change in a fixed output voltage of a power factor correction unit in an apparatus for controlling wireless power transmission.

The graph of FIG. 8 corresponds to a case in which an output voltage of a power factor correction unit is fixed to $V_{in}$. Under the condition, a voltage of $kV_o$ may be applied to a battery of a wireless power reception apparatus, by adjusting a range of an operating frequency of an inverter, as illustrated in FIG. 9.

Figure 9:
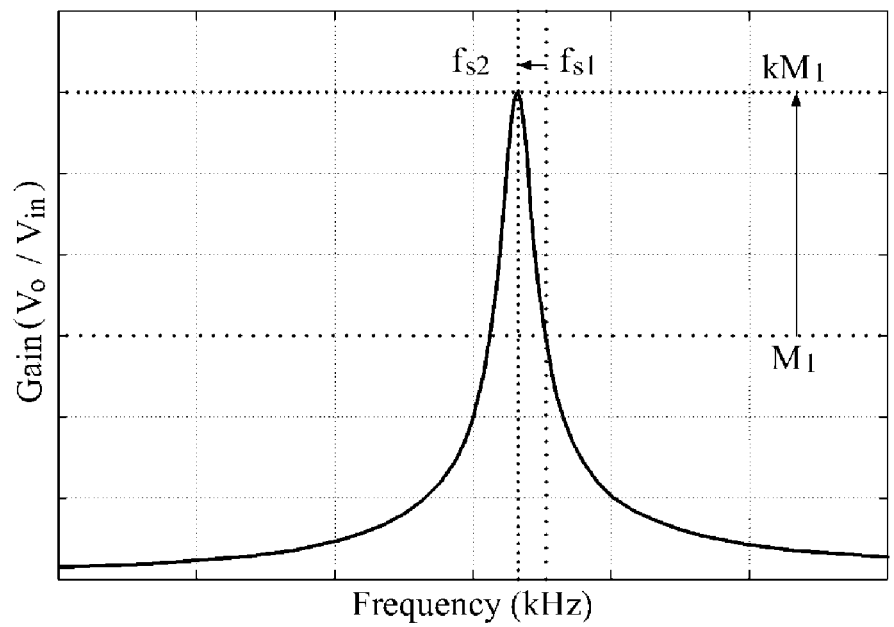
FIG. 9 is a graph illustrating an example of a range of change in a variable frequency of an inverter in a wireless power transmission apparatus.

FIG. 9 illustrates an example of a range of change in a variable frequency of an inverter in a wireless power transmission apparatus.

For example, under the condition in which an output voltage $V_{in}$ of a power factor correction unit is fixed as illustrated in FIG. 8, in order to change a voltage to be applied to a battery from $V_o$ to $kV_o$, an operating frequency of an inverter may be changed from $f_{s1}$ to $f_{s2}$, as illustrated in FIG. 9. In this example, a gain of a system including an apparatus for controlling wireless power transmission and a wireless power reception apparatus may be changed from $M_1$ to $kM_1$. Thus, a voltage of $kV_o$ may be applied to the battery. For example, the operating frequency of the inverter may be determined from among frequencies having gains greater than or equal to a predetermined gain.

Figure 10:
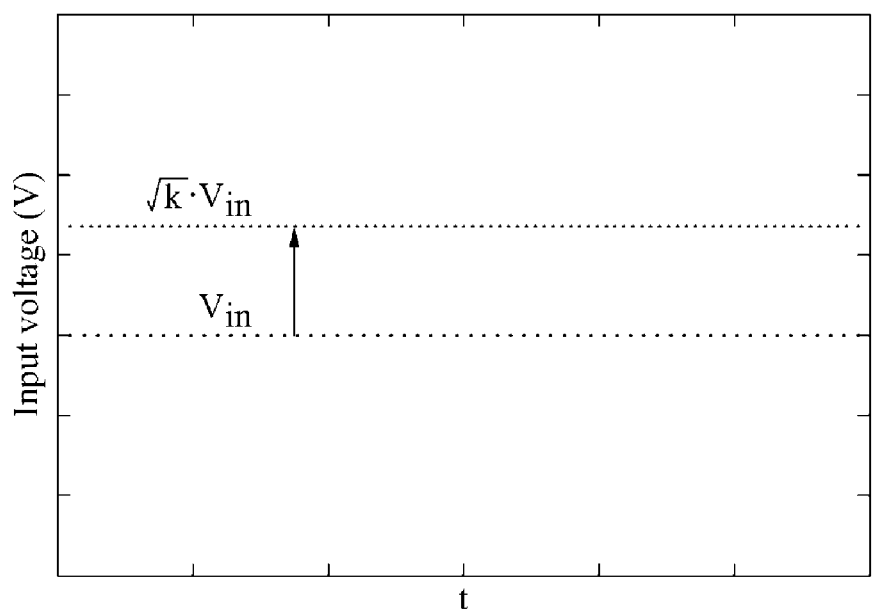
FIG. 10 is a graph illustrating another example of a range of change in an output voltage of a power factor correction unit.

FIG. 10 illustrates another example of a range of change in an output voltage of a power factor correction unit in an apparatus for controlling wireless power transmission.

Figure 11:
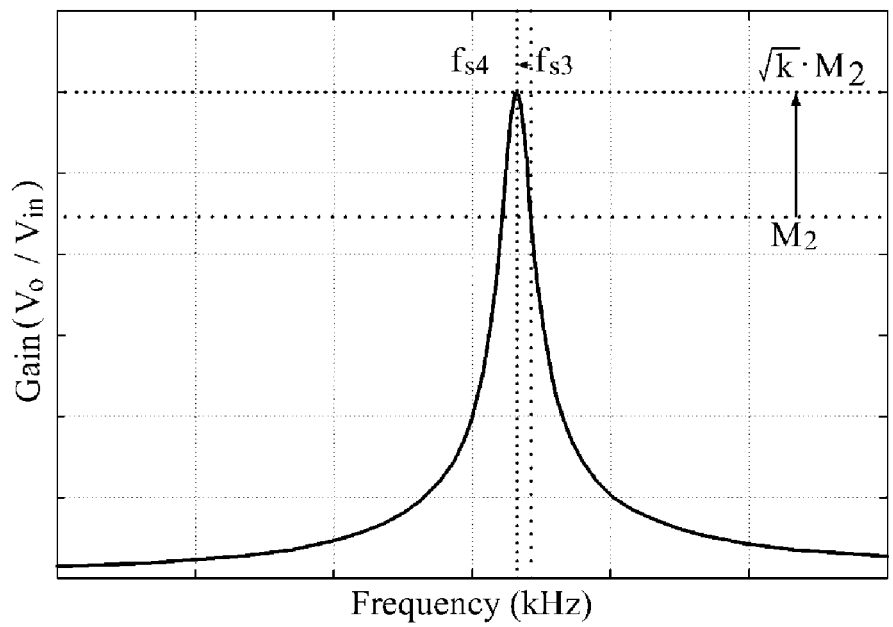
FIG. 11 is a graph illustrating another example of a range of change in a variable frequency of an inverter in a wireless power transmission apparatus.

In order to change a voltage to be applied to a battery from $V_o$ to $kV_o$, as illustrated in FIG. 5, the output voltage of the power factor correction unit and an operating frequency of an inverter may be changed. By correcting the output voltage of the power factor correction unit from $V_{in}$ to $\text{root}(k)V_{in}$, as illustrated in FIG. 10, and by changing the operating frequency of the inverter from $f_{s3}$ to $f_{s4}$, as illustrated in FIG. 11, a gain of a system may be changed from $M_2$ to $\text{root}(k)M_2$. Thus, a voltage of $kV_o$ may be applied to the battery. A value that the operating frequency is changed to may be determined in view of a relationship between a voltage desired to be applied to the battery and a gain of the system.

When both the output voltage of the power factor correction unit and the operating frequency of the inverter are changed, a range of change in the output voltage of the power factor correction unit and a range of change in the operating frequency of the inverter may be reduced.

FIG. 11 illustrates another example of a range of change in a variable frequency of an inverter in an apparatus for controlling wireless power transmission.

Referring to FIG. 11, a gain of a system may be changed from $M_2$ to $\text{root}(k)M_2$ when an operating frequency of the inverter is changed from $f_{s3}$ to $f_{s4}$.

Hereinafter, the term "resonator" in FIGS. 12A through 14B may include, for example, a source resonator, and a target resonator. The resonators of FIGS. 12A through 14B may be applied to the resonators of FIGS. 1 through 11.

Figure 12A:
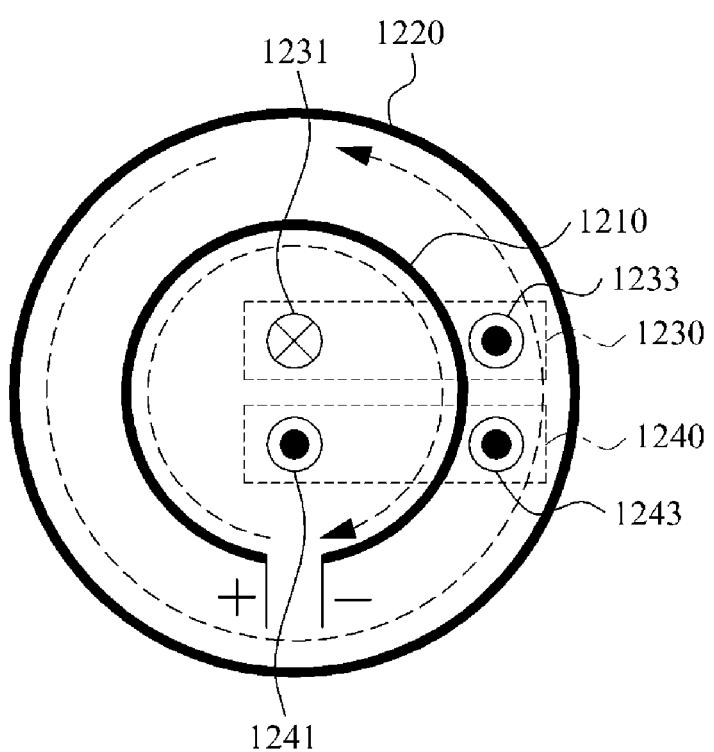
FIGS. 12A and 12B are diagrams illustrating examples of a distribution of magnetic field in a feeder and a resonator.
Figure 12B:
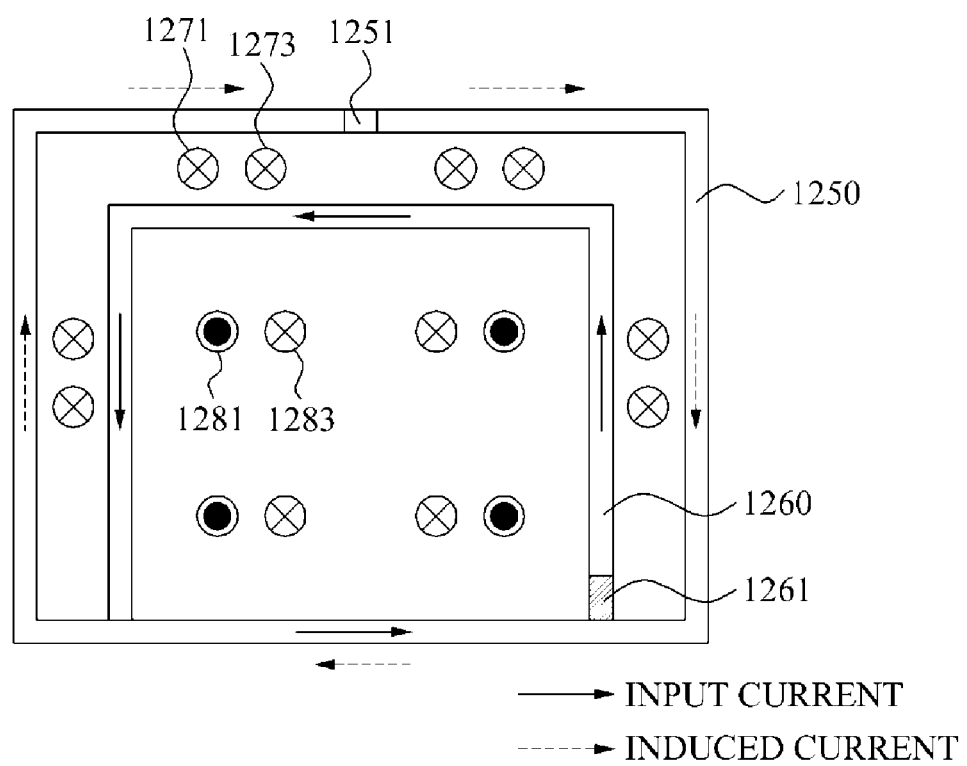

FIGS. 12A and 12B illustrate examples of a distribution of a magnetic field in a feeder and a resonator.

When a resonator receives power supplied through a separate feeder, magnetic fields may form in both the feeder and the resonator.

Referring to FIG. 12A, a magnetic field 1230 may form as input current flows into a feeder 1210. A direction 1231 of the magnetic field 1230 within the feeder 1210 may be opposite to a direction 1233 of the magnetic field 1230 outside the feeder 1210. The magnetic field 1230 formed by the feeder 1210 may induce a current to form inside a resonator 1220. The direction of the induced current may be opposite to a direction of the input current.

Due to the induced current, a magnetic field 1240 may form in the resonator 1220. Directions of a magnetic field formed due to induced current in all positions of the resonator 1220 may be the same. Accordingly, a direction 1241 of the magnetic field 1240 formed by the resonator 1220 may be identical to a direction 1243 of the magnetic field 1240 formed by the resonator 1220.

Thus, when the magnetic field 1230 formed by the feeder 1210 and the magnetic field 1240 formed by the resonator 1220 are combined, strength of the total magnetic field may decrease within the feeder 1210; however, the strength may increase outside the feeder 1210. In an example in which power is supplied to the resonator 1220 through the feeder 1210 configured as illustrated in FIG. 12A, the strength of the total magnetic field may decrease in the center of the resonator 1220, but may increase outside the resonator 1220. In another example in which a magnetic field is randomly distributed in the resonator 1220, it may be difficult to perform impedance matching, because an input impedance may frequently vary. Additionally, when the strength of the total magnetic field is increased, an efficiency of wireless power transmission may be increased. Conversely, when the strength of the total magnetic field is decreased, the efficiency for wireless power transmission may be reduced. Accordingly, the power transmission efficiency may be reduced on average.

FIG. 12B illustrates an example of a structure of a wireless power transmission apparatus in which a resonator 1250 and a feeder 1260 have a common ground. The resonator 1250 includes a capacitor 1251. The feeder 1260 may receive an input of a radio frequency (RF) signal via a port 1261. For example, when the RF signal is input to the feeder 1260, input current may be generated in the feeder 1260. The input current flowing in the feeder 1260 may cause a magnetic field to form, and the magnetic field may induce a current inside the resonator 1250. Additionally, another magnetic field may be formed due to the induced current flowing in the resonator 1250. In this example, a direction of the input current flowing in the feeder 1260 may have a phase opposite to a phase of a direction of the induced current flowing in the resonator 1250. Accordingly, in a region between the resonator 1250 and the feeder 1260, a direction 1271 of the magnetic field formed due to the input current may have the same phase as a direction 1273 of the magnetic field formed due to the induced current. Thus, the strength of the total magnetic field may increase. Conversely, within the feeder 1260, a direction 1281 of the magnetic field formed due to the input current may have a phase opposite to a phase of a direction 1283 of the magnetic field formed due to the induced current. Thus, the strength of the total magnetic field may decrease. Therefore, the strength of the total magnetic field may decrease in the center of the resonator 1250, but may increase outside the resonator 1250.

The feeder 1260 may determine an input impedance by adjusting an internal area of the feeder 1260. The input impedance refers to an impedance viewed in a direction from the feeder 1260 to the resonator 1250. When the internal area of the feeder 1260 increases, the input impedance may increase. Conversely, when the internal area of the feeder 1260 is reduced, the input impedance may be reduced. Because the magnetic field is randomly distributed in the resonator 1250 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance.

Figure 13A:
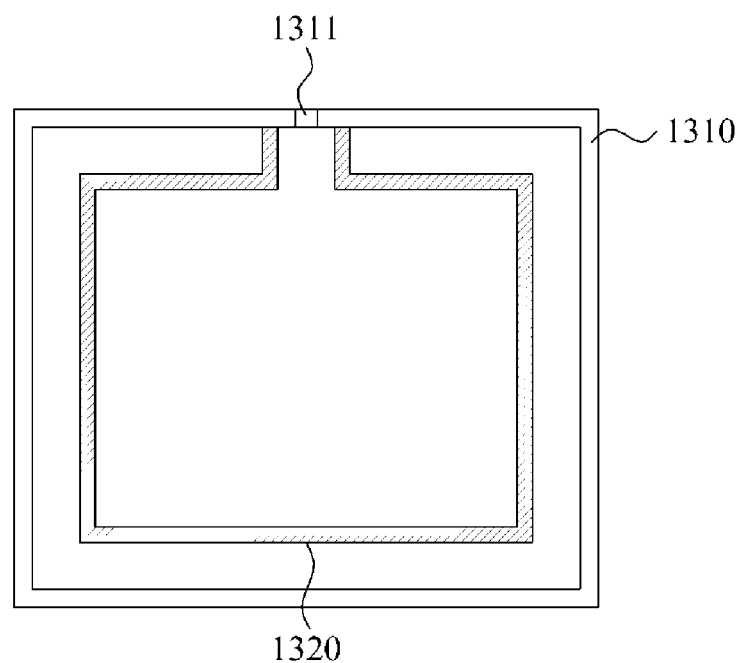
FIGS. 13A and 13B are diagrams illustrating an example of a wireless power transmitter.

FIG. 13A illustrates an example of a wireless power transmission apparatus.

Referring to FIG. 13A, the wireless power transmission apparatus includes a resonator 1310, and a feeding unit 1320. The resonator 1310 may further include a capacitor 1311. The feeding unit 1320 may be electrically connected to both ends of the capacitor 1311.

Figure 13B:
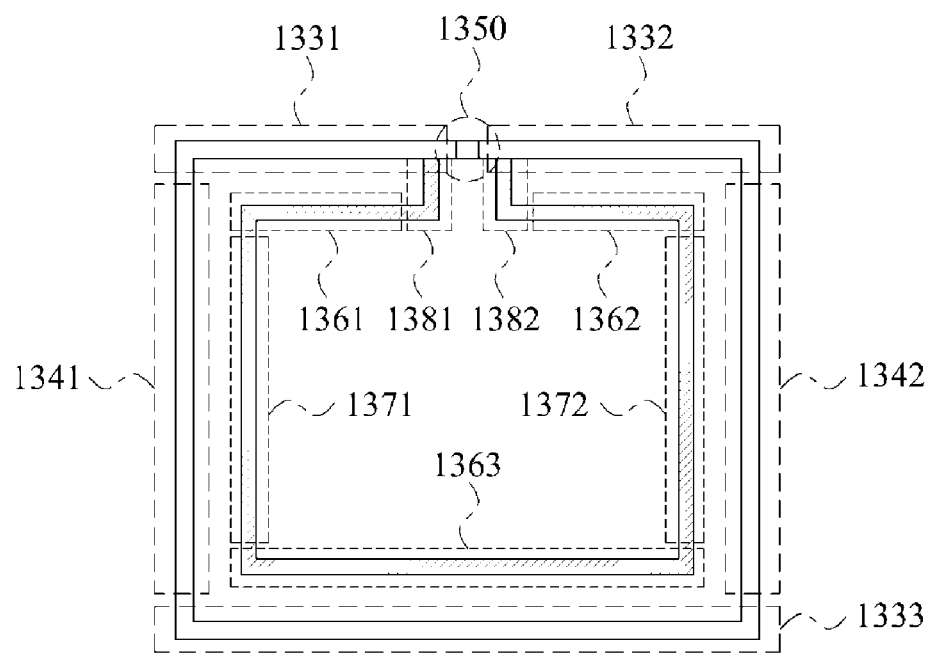

FIG. 13B illustrates structures of the wireless power transmission apparatus of FIG. 13A in detail. The resonator 1310 may include a first transmission line, a first conductor 1341, a second conductor 1342, and at least one first capacitor 1350.

The first capacitor 1350 may be inserted in series between a first signal conducting portion 1331 and a second signal conducting portion 1332 in the first transmission line, and an electric field may be confined within the first capacitor 1350. For example, the first transmission line may include at least one conductor in an upper portion of the first transmission line, and may also include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into and referred to as the first signal conducting portion 1331 and the second signal conducting portion 1332. A conductor disposed in a lower portion of the first transmission line may be referred to as a first ground conducting portion 1333.

Referring to FIG. 13B, the resonator 1310 may have a substantially two-dimensional (2D) structure. The first transmission line may include the first signal conducting portion 1331 and the second signal conducting portion 1332 in the upper portion of the first transmission line. In addition, the first transmission line may include the first ground conducting portion 1333 in the lower portion of the first transmission line. The first signal conducting portion 1331 and the second signal conducting portion 1332 may face the first ground conducting portion 1333. Current may flow through the first signal conducting portion 1331 and the second signal conducting portion 1332.

Additionally, one end of the first signal conducting portion 1331 may be electrically connected (i.e., shorted) to the first conductor 1341, and another end of the first signal conducting portion 1331 may be connected to the first capacitor 1350. One end of the second signal conducting portion 1332 may be shorted to the second conductor 1342, and another end of the second signal conducting portion 1332 may be connected to the first capacitor 1350. Accordingly, the first signal conducting portion 1331, the second signal conducting portion 1332, the first ground conducting portion 1333, and the conductors 1341 and 1342 may be connected to each other, so that the resonator 1310 may have an electrically closed-loop structure. The term "loop structure" may include, for example, a polygonal structure such as a rectangular structure, octagonal structure and the like, and partially or entirely round structure such as a circular structure, an elliptical structure and the like. The expression "having a loop structure" may indicate that the circuit is electrically closed.

The first capacitor 1350 may be inserted into an intermediate portion of the first transmission line. For example, the first capacitor 1350 may be inserted into a space between the first signal conducting portion 1331 and the second signal conducting portion 1332. The first capacitor 1350 may be configured as a lumped element, a distributed element, and the like. For example, a capacitor configured as a distributed element may include zigzagged conductor lines and a dielectric material that has a high permittivity positioned between the zigzagged conductor lines.

When the first capacitor 1350 is inserted into the first transmission line, the resonator 1310 may have a characteristic of a metamaterial. A metamaterial refers to a material having a predetermined electrical property that is not discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials found in nature, a right hand rule may be applied to an electric field, a magnetic field, and a pointing vector; thus, the corresponding materials are referred to as right handed materials (RHMs). However, a metamaterial has a magnetic permeability or a permittivity absent in nature, and may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 1350 inserted as the lumped element is appropriately set, the resonator 1310 may have the characteristic of the metamaterial. Because the resonator 1310 may have a negative magnetic permeability by appropriately adjusting the capacitance of the first capacitor 1350, the resonator 1310 may also be referred to as an MNG resonator. Various criteria may be applied to determine the appropriate amount of capacitance of the first capacitor 1350. For example, the various criteria may include a criterion for enabling the resonator 1310 to have the characteristic of the metamaterial, a criterion for enabling the resonator 1310 to have a negative magnetic permeability in a target frequency, a criterion for enabling the resonator 1310 to have a zeroth order resonance characteristic in the target frequency, and the like. Based on at least one criterion among the aforementioned criteria, the capacitance of the first capacitor 1350 to be used may be determined.

The resonator 1310, also referred to as the MNG resonator 1310, may have a zeroth order resonance characteristic of having, as a resonance frequency, a frequency when a propagation constant is "0". Because the resonator 1310 may have a zeroth order resonance characteristic, the resonance frequency may be independent with respect to a physical size of the MNG resonator 1310. By appropriately designing or determining the configuration of the first capacitor 1350, the MNG resonator 1310 may sufficiently change the resonance frequency without changing the physical size of the MNG resonator 1310.

In a near field, for instance, the electric field may be concentrated on the first capacitor 1350 inserted into the first transmission line. Accordingly, due to the first capacitor 1350, the magnetic field may become dominant in the near field. The MNG resonator 1310 may have a relatively high Q-argument using the first capacitor 1350 of the lumped element; thus, it may be possible to enhance an efficiency of power transmission. For example, the Q-argument may indicate a level of an ohmic loss or a ratio of a reactance with respect to a resistance in the wireless power transmission. The efficiency of the wireless power transmission may increase according to an increase in the Q-argument.

Although not illustrated in FIG. 13B, a magnetic core may be further provided to pass through the MNG resonator 1310. The magnetic core may perform a function of increasing a power transmission distance.

Referring to FIG. 13B, the feeding unit 1320 may include a second transmission line, a third conductor 1371, a fourth conductor 1372, a fifth conductor 1381, and a sixth conductor 1382.

The second transmission line may include a third signal conducting portion 1361 and a fourth signal conducting portion 1362 in an upper portion of the second transmission line. In addition, the second transmission line may include a second ground conducting portion 1363 in a lower portion of the second transmission line. The third signal conducting portion 1361 and the fourth signal conducting portion 1362 may face the second ground conducting portion 1363. Current may flow through the third signal conducting portion 1361 and the fourth signal conducting portion 1362.

Additionally, one end of the third signal conducting portion 1361 may be shorted to the third conductor 1371, and another end of the third signal conducting portion 1361 may be connected to the fifth conductor 1381. One end of the fourth signal conducting portion 1362 may be shorted to the fourth conductor 1372, and another end of the fourth signal conducting portion 1362 may be connected to the sixth conductor 1382. The fifth conductor 1381 may be connected to the first signal conducting portion 1331, and the sixth conductor 1382 may be connected to the second signal conducting portion 1332. The fifth conductor 1381 and the sixth conductor 1382 may be connected in parallel to both ends of the first capacitor 1350. In this example, the fifth conductor 1381 and the sixth conductor 1382 may be used as input ports to receive an RF signal as an input.

Accordingly, the third signal conducting portion 1361, the fourth signal conducting to portion 1362, the second ground conducting portion 1363, the third conductor 1371, the fourth conductor 1372, the fifth conductor 1381, the sixth conductor 1382, and the resonator 1310 may be connected to each other, so that the resonator 1310 and the feeding unit 1320 may have an electrically closed-loop structure. The term "loop structure" may include, for example, a polygonal structure such as a rectangular structure, an octagonal structure and the like, or a partially or entirely round structure, such as a circular structure, an elliptical structure and the like. When an RF signal is received via the fifth conductor 1381 or the sixth conductor 1382, input current may flow in the feeding unit 1320 and the resonator 1310, a magnetic field may be formed due to the input current. The magnetic field may induce a current in the resonator 1310. A direction of the input current flowing in the feeding unit 1320 may be the same as a direction of the induced current flowing in the resonator 1310. Thus, strength of the total magnetic field may increase in the center of the resonator 1310, but may decrease outside the resonator 1310.

An input impedance may be determined based on an area of a region between the resonator 1310 and the feeding unit 1320; accordingly, a separate matching network used to match the input impedance to an output impedance of a power amplifier may not be required. For example, even when the matching network is used, the input impedance may be determined by adjusting a size of the feeding unit 1320; thus, a structure of the matching network may be simplified. The simplified structure of the matching network may minimize a matching loss of the matching network.

The second transmission line, the third conductor 1371, the fourth conductor 1372, the fifth conductor 1381, and the sixth conductor 1382 may form the same structure as the resonator 1310. In an example in which the resonator 1310 has a loop structure, the feeding unit 1320 may also have a loop structure. In another example in which the resonator 1310 has a circular structure, the feeding unit 1320 may also have a circular structure.

Figure 14A:
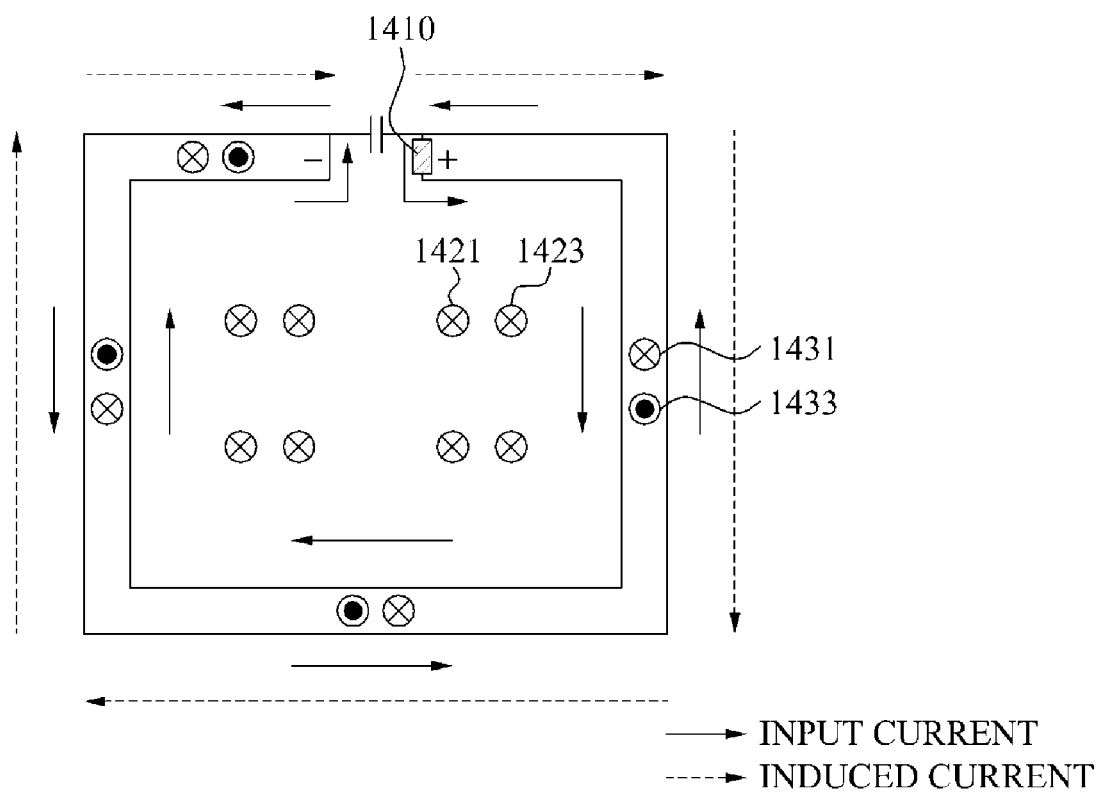
FIG. 14A is a diagram illustrating an example of a distribution of magnetic field within a resonator based on feeding of a feeding unit.

FIG. 14A illustrates an example of a distribution of a magnetic field within a resonator based on feeding of a feeding unit.

Figure 14B:
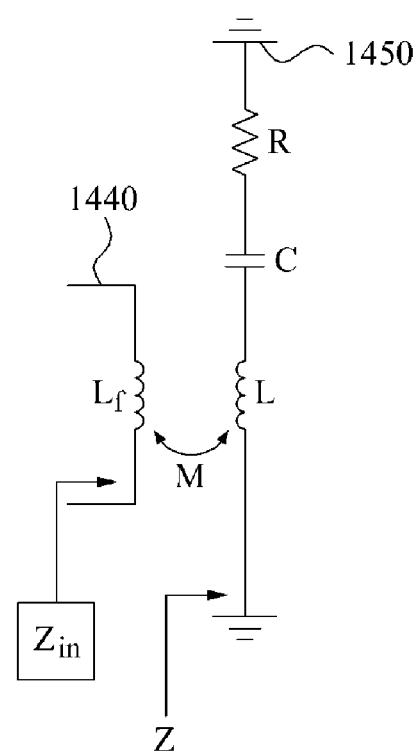
FIG. 14B is a diagram illustrating examples of equivalent circuits of a feeding unit and a resonator.

A feeding operation may refer to supplying power to a source resonator in wireless power transmission, or refer to supplying AC power to a rectification unit in wireless power transmission. FIG. 14A illustrates a direction of input current flowing in the feeding unit, and a direction of induced current induced in the source resonator. Additionally, FIG. 14A illustrates a direction of a magnetic field formed due to the input current of the feeding unit, and a direction of a magnetic field formed due to the induced current of the source resonator. In particular, FIG. 14A briefly illustrates the resonator 1310 and the feeding unit 1320 of FIG. 13A, and FIG. 14B illustrates examples of equivalent circuits of the feeding unit 1320 and the resonator 1310.

Referring to FIG. 14A, the fifth conductor 1381 or the sixth conductor 1382 of the feeding unit 1320 of FIG. 13A may be used as an input port 1410. The input port 1410 may receive an RF signal as an input. The RF signal may be output from a power amplifier. The power amplifier may increase or decrease an amplitude of the RF signal based on a demand by a target device. The RF signal received by the input port 1410 may be displayed in the form of input current flowing in the feeding unit 1320. The input current may flow in a clockwise direction in the feeding unit 1320, along a transmission line of the feeding unit 1320. The fifth conductor 1381 of the feeding unit 1320 may be electrically connected to the resonator 1310. For example, the fifth conductor 1381 may be connected to a first signal conducting portion 1331 of the resonator 1310. Accordingly, the input current may flow in the resonator 1310, as well as, in the feeding unit 1320. The input current may flow in a counterclockwise direction in the resonator 1310. The input current flowing in the resonator 1310 may cause a magnetic field to form. The magnetic field may generate a current in the resonator 1310 by induction. The induced current may flow in a clockwise direction in the resonator 1310. For example, the induced current may transfer energy to the capacitor 1311 of the resonator 1310, and a magnetic field may form due to the induced current. In this example, the input current flowing in the feeding unit 1320 and the resonator 1310 of FIG. 13A is indicated by a solid line of FIG. 14A, and the induced current flowing in the resonator 1310 is indicated by a dotted line of FIG. 14A.

A direction of a magnetic field formed due to a current may be determined based on the right hand rule. Referring to FIG. 14A, within the feeding unit 1320, a direction 1421 of a magnetic field formed due to the input current flowing in the feeding unit 1320 may be identical to a direction 1423 of a magnetic field formed due to the induced current flowing in the resonator 1310. Accordingly, the strength of the total magnetic field may increase within the feeding unit 1320.

In a region between the feeding unit 1320 and the resonator 1310, a direction 1433 of a magnetic field formed due to the input current flowing in the feeding unit 1320 may be opposite to a direction 1431 of a magnetic field formed due to the induced current flowing in the resonator 1310. Accordingly, the strength of the total magnetic field may decrease in the region between the feeding unit 1320 and the resonator 1310.

A strength of a magnetic field generally decreases in the center of a resonator with the loop structure, and increases outside the resonator. However, referring to FIG. 14A, the feeding unit 1320 may be electrically connected to both ends of the capacitor 1311 of the resonator 1310, and accordingly the induced current of the resonator 1310 may flow in the same direction as the input current of the feeding unit 1320. Since the induced current of the resonator 1320 flows in the same direction as the input current of the feeding unit 1320, the strength of the total magnetic field may increase within the feeding unit 1320, and may decrease outside the feeding unit 1320. As a result, the strength of the total magnetic field may increase in the center of the resonator 1310 with the loop structure, and may decrease outside the resonator 1310, due to the feeding unit 1320. Thus, the strength of the total magnetic field may be equalized within the resonator 1310.

The power transmission efficiency for transferring a power from the source resonator to a target resonator may be in proportion to the strength of the total magnetic field formed in the source resonator. In other words, when the strength of the total magnetic field increases in the center of the resonator, the power transmission efficiency may also increase.

Referring to FIG. 14B, the feeding unit 1440 and the resonator 1450 may be expressed as equivalent circuits. An example of an input impedance $Z_{in}$ viewed in a direction from the feeding unit 1440 to the resonator 1450 may be computed, as given in Equation 1.

$$Z_{in} = \frac{(\omega M)^2}{Z} \quad \text{[Equation 1]}$$

In Equation 1, M denotes a mutual inductance between the feeding unit 1440 and the resonator 1450, ω denotes a resonance frequency between the feeding unit 1440 and the resonator 1450, and Z denotes an impedance viewed in a direction from the resonator 1450 to a target device. The input impedance $Z_n$ may be in proportion to the mutual inductance M. Thus, the input impedance $Z_{in}$ may be controlled by adjusting the mutual inductance M between the feeding unit 1440 and the resonator 1450. The mutual inductance M may be adjusted based on an area of a region between the feeding unit 1440 and the resonator 1450. The area of the region between the feeding unit 1440 and the resonator 1450 may be adjusted based on a size of the feeding unit 1440. Accordingly, the input impedance $Z_{in}$ may be determined based on the size of the feeding unit 1440, and thus a separate matching network may not be required to perform impedance matching with an output impedance of a power amplifier.

In the resonator 1450 and the feeding unit 1440 included in a wireless power reception apparatus, a magnetic field may be distributed as illustrated in FIG. 14A. The resonator 1450 may operate as a target resonator. For example, the target resonator may receive wireless power from a source resonator via magnetic coupling. Due to the received wireless power, induced current may be generated in the target resonator. A magnetic field formed due to the induced current in the target resonator may cause another induced current to be generated in the feeding unit 1440. In this example, when the resonator 1450 is connected to the feeding unit 1440 as illustrated in FIG. 14A, the induced current generated in the resonator 1450 may flow in the same direction as the induced current generated in the feeding unit 1440. Thus, the strength of the total magnetic field may increase within the feeding unit 1440, but may decrease in a region between the feeding unit 1440 and the resonator 1450.

Figure 15:
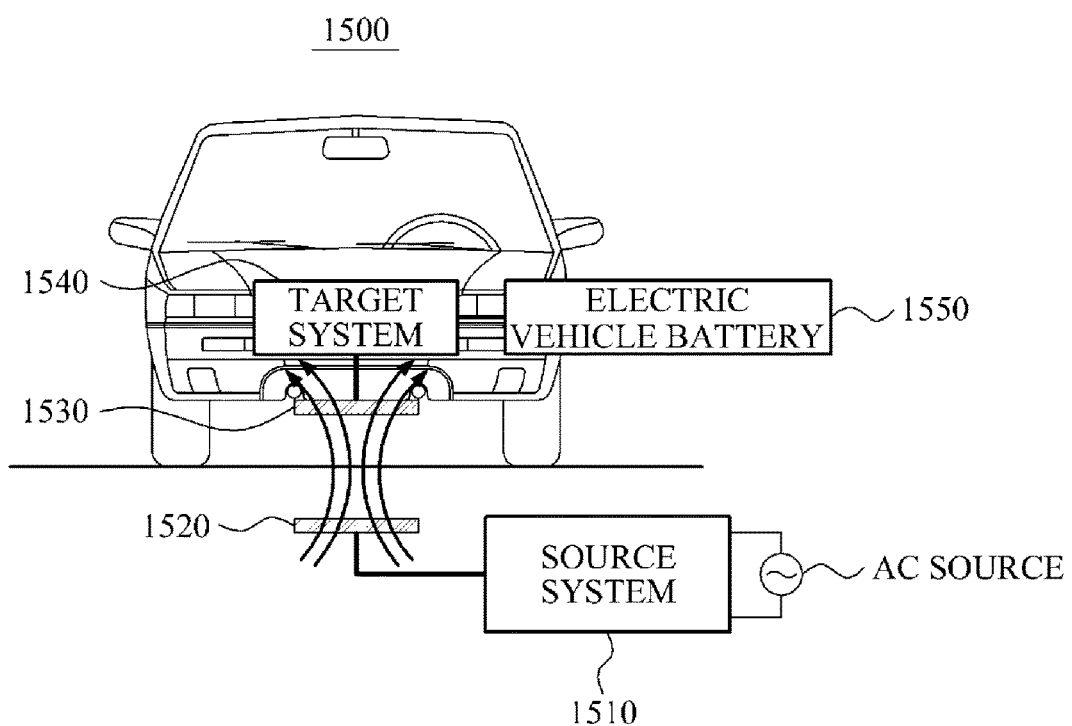
FIG. 15 is a diagram illustrating an example of an electric vehicle charging system.

FIG. 15 illustrates an example of an electric vehicle charging system.

Referring to FIG. 15, an electric vehicle charging system 1500 includes a source system 1510, a source resonator 1520, a target resonator 1530, a target system 1540, and an electric vehicle battery 1550.

The electric vehicle charging system 1500 may have a similar structure to the wireless power transmission control system illustrated in FIG. 4. The source system 1510 and the source resonator 1520 in the electric vehicle charging system 1500 may function as a source. The target resonator 1530 and the target system 1540 in the electric vehicle charging system 1500 may function as a target.

Similar to the wireless power transmission apparatus 410 illustrated in FIG. 4, the source system 1510 may include a power supply, an AC/DC converter, a PFC, an inverter, and a communication unit. The target system 1540 may include a rectifier, a power storage unit, a battery, and a communication unit, similar to the wireless power reception apparatus 420 illustrated in FIG. 4.

The electric vehicle battery 1550 may be charged by the target system 1540.

The electric vehicle charging system 1500 may use a resonant frequency in a band of a few kilohertz (KHz) to tens of megahertz (MHz) to transmit power wirelessly.

The source system 1510 may generate power, based on a type of charging vehicle, a capacity of a battery, and a charging state of a battery, and may supply the generated power to the target system 1540.

The source system 1510 may control the source resonator 1520 and the target resonator 1530 to be aligned. For example, when the source resonator 1520 and the target resonator 1530 are not aligned, the controller of the source system 1510 may transmit a message to the target system 1540, and may control alignment between the source resonator 1520 and the target resonator 1530.

For example, when the target resonator 1530 is not located in a position enabling maximum magnetic resonance, the source resonator 1520 and the target resonator 1530 may not be aligned. When a vehicle does not stop accurately, the source system 1510 may induce a position of the vehicle to be adjusted, and may control the source resonator 1520 and the target resonator 1530 to be aligned. In another example, the position of the source resonator 1520 may be adjusted to align the source resonator 1520 to the target resonator 1530 of the vehicle. The source resonator 1520 may include a superconducting material. The source resonator 1520 may be cooled through a refrigerant cooled by a cooling system.

The source system 1510 and the target system 1540 may transmit or receive an ID of a vehicle, or may exchange various messages, through communication.

The descriptions of FIGS. 2 through 14B may be applied to the electric vehicle charging system 1500. However, the electric vehicle charging system 1500 may use a resonant frequency in a band of a few KHz to tens of MHz, and may transmit power that is equal to or higher than tens of watts to charge the electric vehicle battery 1550.

Figure 16:
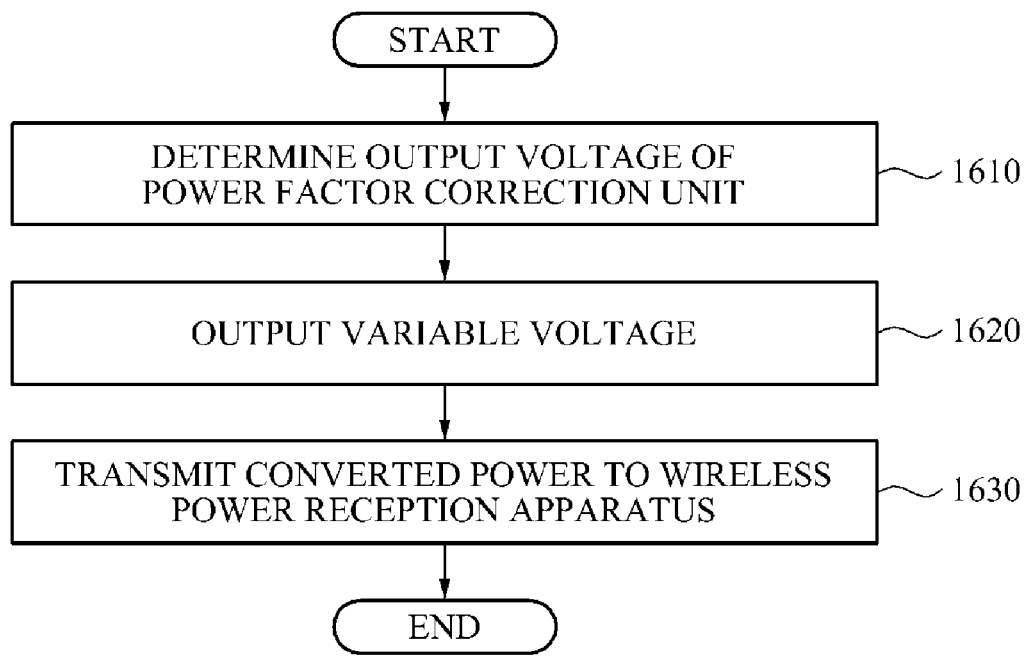
FIG. 16 is a flowchart illustrating an example of a wireless power transmission control method.

FIG. 16 illustrates an example of a wireless power transmission control method.

The wireless power transmission control method relates to a method of controlling power transmission of a wireless power transmission apparatus, and the wireless power transmission apparatus may include a controller, a power factor correction unit, and a resonance unit.

Referring to FIG. 16, in 1610, the controller determines an output voltage of the power factor correction unit based on charging information of a battery obtained from a wireless power reception apparatus.

In 1620, the power factor correction unit corrects an input voltage input from a power supply into the determined output voltage, thereby outputting a variable voltage varying adaptively based on a result of the determining performed by the controller.

In 1630, the resonance unit transmits power converted from the variable voltage to an AC voltage using a resonant frequency of a resonator to the wireless power reception apparatus that mutually resonates with the resonator at the resonant frequency.

The controller may calculate a voltage gain with respect to the output voltage of the power factor correction unit, based on a value of a voltage to be applied to the battery of the wireless power reception apparatus, and may determine a value of a variable frequency, among frequencies having transmission efficiencies greater than or equal to a predetermined transmission efficiency, based on a transmission efficiency allowing for the calculated voltage gain. In this example, the value of the voltage to be applied to the battery may be obtained from the wireless power reception apparatus.

In this example, a power transmission efficiency may be maximized by removing an active load, a pre-regulator, and a post-regulator that are often used for transmission of a large amount of power, and by replacing their functions through adjustment of an output voltage of the power factor correction unit and an operation frequency of an inverter.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more non-transitory computer readable recording mediums.

The non-transitory computer readable recording medium may include any data storage device that can store data that can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for controlling wireless power transmission, comprising:
   a controller configured to determine an output voltage of a power factor correction unit based on charging information of a battery of a wireless power reception apparatus;
   the power factor correction unit configured to correct an input voltage into the determined output voltage, and output a variable voltage; and
   a resonance unit configured to transmit power converted from the variable voltage to the wireless power reception apparatus,
   wherein the charging information is obtained from the wireless power reception apparatus, and comprises any one or any combination of two or more of a charging level, a charging capacity, and a charging type of the battery,
   wherein the controller is configured to determine a value of a variable frequency in a resonant frequency band of the resonator, based on the obtained charging information of the battery.

2. The apparatus of claim 1, wherein the power factor correction unit is configured to obtain the input voltage from a power supply, and to output the variable voltage based on a result of the determining of the controller; and
   the resonance unit is configured to transmit the power converted from the variable voltage to an alternating current (AC) voltage using a resonant frequency of a resonator to the wireless power reception apparatus.

3. The apparatus of claim 2, further comprising:
   an inverter configured to convert a fixed output voltage into an AC voltage based on the variable frequency,
   wherein the power factor correction unit is configured to output the fixed output voltage.

4. The apparatus of claim 3, wherein the controller comprises:
   a gain calculator configured to calculate a voltage gain with respect to the output voltage of the power factor correction unit, based on a value of a voltage to be applied to the battery; and
   a frequency determiner configured to determine a value of the variable frequency, among frequencies having transmission efficiencies greater than or equal to a predetermined transmission efficiency, based on a transmission efficiency allowing for the calculated voltage gain,
   wherein the value of the voltage to be applied to the battery is obtained from the wireless power reception apparatus.

5. The apparatus of claim 2, further comprising:
   an inverter configured to convert an output voltage of the power factor correction unit into an AC voltage based on a variable frequency,
   wherein the controller is configured to determine a value of the variable frequency in a resonant frequency band of the resonator and the output voltage of the power factor correction unit, based on the obtained charging information of the battery.

6. The apparatus of claim 1, further comprising:
   a communication unit configured to receive the charging information of the battery from the wireless power reception apparatus.

7. An apparatus for controlling wireless power transmission, Comprising:
a controller configured to determine a variable frequency of an inverter based on charging information of a battery of a wireless power reception apparatus;
the inverter configured to convert an input voltage into an alternating (AC) voltage based on the determined variable frequency; and
a resonance unit configured to transmit power converted into the AC voltage to the wireless power reception apparatus,
wherein the charging information is obtained from the wireless power reception apparatus, and comprises any one or any combination of two or more of a charging level, a charging capacity, and a charging type of the battery,
wherein the controller is configured to determine a value of the variable frequency in a resonant frequency band of the resonator, based on the obtained charging information of the battery.

8. The apparatus of claim 7, wherein the input voltage to the inverter is obtained from a power supply; and
the resonance unit is configured to transmit the power converted into the AC voltage using the variable frequency as a resonant frequency of a resonator to the wireless power reception apparatus.

9. The apparatus of claim 8, further comprising:
a power factor correction unit configured to correct an input voltage from a power supply into the determined output voltage, to output a variable voltage based on a result of the determining by the controller,
wherein the inverter is configured to convert the variable voltage into an AC voltage using a basic resonant frequency of the resonator.

10. The apparatus of claim 8, wherein the controller comprises:
a gain calculator configured to calculate a voltage gain with respect to the input voltage, based on a value of a voltage to be applied to the battery; and
a frequency determiner configured to determine a value of the variable frequency, among frequencies having transmission efficiencies greater than or equal to a predetermined transmission efficiency, based on a transmission efficiency allowing for the calculated voltage gain,
wherein the value of the voltage to be applied to the battery is obtained from the wireless power reception apparatus.

11. The apparatus of claim 8, further comprising:
a power factor correction unit configured to correct the input voltage into the determined output voltage and output a variable voltage based on a result of the determining by the controller,
wherein the controller is configured to determine a value of the variable frequency in a resonant frequency band of the resonator and the output voltage of the power factor correction unit, based on the obtained charging information of the battery.

12. The apparatus of claim 7, further comprising:
a communication unit configured to receive the charging information of the battery from the wireless power reception apparatus.

13. An apparatus for controlling wireless power transmission, comprising:
a controller configured to determine an output voltage of a power factor correction unit and a variable frequency of an inverter, based on charging information of a battery of a wireless power reception apparatus;
the power factor correction unit configured to correct an input voltage into the determined output voltage, to output a variable voltage based on a result of the determining by the controller;
the inverter configured to convert the variable voltage into an alternating (AC) voltage based on the determined variable frequency; and
a resonance unit configured to transmit power converted into the AC voltage to the wireless power reception apparatus,
wherein the charging information is obtained from the wireless power reception apparatus, and comprises any one or any combination of two or more of a charging level, a charging capacity, and a charging type of the battery,
wherein the controller is configured to determine a value of the variable frequency in a resonant frequency band of the resonator, based on the obtained charging information of the battery.

14. The apparatus of claim 13,
the power factor correction unit is configured to obtain the input voltage from a power supply; and
the resonance unit is configured to transmit the power converted into the AC voltage using the variable frequency as a resonant frequency of a resonator to the wireless power reception apparatus.

15. The apparatus of claim 14, wherein the controller comprises:
a gain calculator configured to calculate a voltage gain with respect to the output voltage of the power factor correction unit, based on a value of a voltage to be applied to the battery;
a frequency determiner configured to determine a value of the variable frequency, among frequencies having transmission efficiencies greater than or equal to a predetermined transmission efficiency, based on a transmission efficiency allowing for the calculated voltage gain; and
a voltage determiner configured to an output voltage of the power factor correction unit based on the transmission efficiency,
wherein the value of the voltage to be applied to the battery is obtained from the wireless power reception apparatus.

16. The apparatus of claim 13, further comprising:
a communication unit configured to receive charging information of the battery from the wireless power reception apparatus.

17. A method for controlling power transmission, the method comprising:
determining an output voltage of a power factor correction unit based on charging information of a battery of a wireless power reception apparatus;
correcting an input voltage to the power factor correction unit into the determined output voltage, and outputting a variable voltage that varies based on a result of the determining; and
transmitting power converted from the variable voltage into an alternating (AC) voltage to a wireless power reception apparatus,
wherein the determining of the output voltage is performed with a controller of an apparatus for controlling wireless transmission; and
the charging information is obtained from the wireless power reception apparatus, and comprises any one or any combination of two or more of a charging level, a charging capacity, and a charging type of the battery.

18. The method of claim 17, wherein the determining of the output voltage comprises:
calculating, by the controller, a voltage gain with respect to the output voltage of the power factor correction unit, based on a value of a voltage to be applied to the battery; and
determining, by the controller, a value of a variable frequency, among frequencies having transmission efficiencies greater than or equal to a predetermined transmission efficiency, based on a transmission efficiency allowing for the calculated voltage gain,
wherein the value of the voltage to be applied to the battery is obtained from the wireless power reception apparatus.

\* \* \* \* \*